(12) United States Patent
Hua et al.

(10) Patent No.: US 11,983,414 B2
(45) Date of Patent: May 14, 2024

(54) SUCCESSIVE RAID DISTRIBUTION FOR SINGLE DISK EXPANSION WITH EFFICIENT AND BALANCED SPARE CAPACITY

(71) Applicant: Dell Products L.P., Hopkinton, MA (US)

(72) Inventors: Kuolin Hua, Natick, MA (US); Kunxiu Gao, Boxborough, MA (US); James Guyer, Northboro, MA (US)

(73) Assignee: Dell Products L.P.

( * ) Notice: Subject to any disclaimer, the term of this patent is extended or adjusted under 35 U.S.C. 154(b) by 190 days.

(21) Appl. No.: 17/867,722

(22) Filed: Jul. 19, 2022

(65) Prior Publication Data
US 2024/0028212 A1  Jan. 25, 2024

(51) Int. Cl.
*G06F 3/06* (2006.01)

(52) U.S. Cl.
CPC .......... *G06F 3/0614* (2013.01); *G06F 3/0631* (2013.01); *G06F 3/0689* (2013.01)

(58) Field of Classification Search
CPC .... G06F 3/0614; G06F 3/0631; G06F 3/0689; G06F 11/1088
See application file for complete search history.

*Primary Examiner* — Charles Rones
*Assistant Examiner* — Han V Doan
(74) *Attorney, Agent, or Firm* — Anderson Gorecki LLP

(57) ABSTRACT

A drive subset matrix is created with at least N+1 drives each having N*N same-size subdivisions. Conceptually, N submatrices are created along with spares equivalent to at least one drive of storage capacity. The spares are located such that every drive has an equal number of spares +/−1. One protection group is located in a lowest indexed subdivision of each of the submatrices. Members of other protection groups are located by selecting members in round robin order and placing each selected member in a free subdivision having a lowest drive index and lowest subdivision index. The drive subset can be grown, split, and reorganized to restore balanced and efficient distribution of spares.

20 Claims, 12 Drawing Sheets

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | b | c | d | F | g | h | i | K | l | m | n | P | | | |
| 2 | A | c | d | e | F | h | i | j | K | m | n | o | P | | | |
| 3 | A | d | e | b | F | i | j | g | K | n | o | l | P | | | |
| 4 | A | e | b | c | F | j | g | h | K | o | l | m | P | | | |
| 5 | e | b | c | d | j | g | h | i | o | l | m | n | | | | |

Figure 3

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | b | c | d | F | g | h | i | K | l | m | n | P | e | j | o |
| 2 | A | c | d | e | F | h | i | j | K | m | n | o | P | b | g | l |
| 3 | A | d | e | b | F | i | j | g | K | n | o | l | P | c | h | m |
| 4 | A | e | b | c | F | j | g | h | K | o | l | m | P | | | |
| 5 | e | b | c | d | j | g | h | i | o | l | m | n | P | A | F | K |

Figure 4

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | b | c | d | F | g | h | i | K | l | m | n | P | e | j | o |
| 2 | A | c | d | e | F | h | i | j | K | m | n | o | P | b | g | l |
| 3 | A | d | e | b | F | i | j | g | K | n | o | l | P | c | h | m |
| 4 | A | e | b | c | F | j | g | h | K | o | l | m | P | d | i | n |
| 5 | e | b | c | d | j | g | h | i | o | l | m | n | | | | |

Figure 5

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | b | c | d | F | g | h | i | K | l | m | n | P | | | |
| 2 | A | c | d | e | F | h | i | j | K | m | n | o | P | | | |
| 3 | A | d | e | b | F | i | j | g | K | n | o | l | P | | | |
| 4 | A | e | b | c | F | j | g | h | K | o | l | m | P | | | |
| 5 | e | b | c | d | j | g | h | i | o | l | m | n | | | | |
| 6 | b | c | d | e | g | h | i | j | l | m | n | o | | | | |

Figure 6

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | B | c | d | F | G | h | i | K | L | m | n | P | | | |
| 2 | A | B | d | e | F | G | i | j | K | L | n | o | P | | | |
| 3 | A | B | e | b | F | G | j | g | K | L | o | l | P | | | |
| 4 | A | B | b | c | F | G | g | h | K | L | l | m | P | | | |
| 5 | e | b | c | d | j | g | h | i | o | l | m | n | | | | |
| 6 | b | c | d | e | g | h | i | j | l | m | n | o | | | | |

Figure 7

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | B | C | D | F | G | H | I | K | L | M | N | P | | | |
| 2 | A | B | C | D | F | G | H | I | K | L | M | N | P | | | |
| 3 | A | B | C | D | F | G | H | I | K | L | M | N | P | | | |
| 4 | A | B | C | D | F | G | H | I | K | L | M | N | P | | | |

10

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 5 | e | b | c | d | j | g | h | i | o | l | m | n | | | | |
| 6 | b | c | d | e | g | h | i | j | l | m | n | o | | | | |
| 7 | c | d | e | b | h | i | j | g | m | n | o | l | | | | |
| 8 | d | e | b | c | i | j | g | h | n | o | l | m | | | | |

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | B | C | D | F | G | H | I | K | L | M | N | P | | | |
| 2 | A | B | C | D | F | G | H | I | K | L | M | N | P | | | |
| 3 | A | B | C | D | F | G | H | I | K | L | M | N | P | | | |
| 4 | A | B | C | D | F | G | H | I | K | L | M | N | P | | | |

10

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 5 | *a* | b | c | d | *f* | g | h | i | *k* | l | m | n | *p* | | | |
| 6 | *a* | c | d | e | *f* | h | i | j | *k* | m | n | o | *p* | | | |
| 7 | *a* | d | e | b | *f* | i | j | g | *k* | n | o | l | *p* | | | |
| 8 | *a* | e | b | c | *f* | j | g | h | *k* | o | l | m | *p* | | | |
| 9 | e | b | c | d | j | g | h | i | o | l | m | n | | | | |

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | B | C | D | F | G | H | I | K | L | M | N | P | | | |
| 2 | A | B | C | D | F | G | H | I | K | L | M | N | P | | | |
| 3 | A | B | C | D | F | G | H | I | K | L | M | N | P | | | |
| 4 | A | B | C | D | F | G | H | I | K | L | M | N | P | | | |
| 10 | | B | C | D | | G | H | I | | L | M | N | | | | |

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | B | C | D | F | G | H | I | K | L | M | N | P | | | |
| 2 | A | B | C | E | F | G | H | J | K | L | M | O | P | | | |
| 3 | A | B | E | D | F | G | J | I | K | L | O | N | P | | | |
| 4 | A | E | C | D | F | J | H | I | K | O | M | N | P | | | |
| 10 | E | B | C | D | J | G | H | I | O | L | M | N | | | | |

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | B | C | D | F | G | H | I | K | L | M | N | P | | | |
| 2 | | | | A | B | C | E | F | G | H | J | K | L | M | O | P | D | I | N |
| 3 | | | | A | B | E | D | F | G | J | I | K | L | O | N | P | C | H | M |
| 4 | | | | A | E | C | D | F | J | H | I | K | O | M | N | P | B | G | L |
| 10 | | | | E | B | C | D | J | G | H | I | O | L | M | N | P | A | F | K |

Figure 12

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 11 | A | B | C | D | F | G | H | I | K | L | M | N | P | Q | R |   |
| 12 | A | B | C | E | F | G | H | J | K | L | M | O | P | Q | R |   |
| 13 | A | B | E | D | F | G | J | I | K | L | O | N | P | Q |   |   |
| 14 | A | E | C | D | F | J | H | I | K | O | M | N | P |   | R |   |
| 20 | E | B | C | D | J | G | H | I | O | L | M | N |   | Q | R |   |

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 15 | a | b | c | d | f | g | h | i | k | l | m | n | p | q |   | r |
| 16 | a | c | d | e | f | h | i | j | k | m | n | o | p |   | r |   |
| 17 | a | d | e | b | f | i | j | g | k | n | o | l | p | r |   | q |
| 18 | a | e | b | c | f | j | g | h | k | o | l | m | p |   | q |   |
| 19 | e | b | c | d | j | g | h | i | o | l | m | n |   | q |   | r |

Figure 13

| disk/# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 11 | A | B | C | D | F | G | H | I | K | L | M | N | P | Q | R | *j* |
| 12 | A | B | C | E | F | G | H | J | K | L | M | O | P | Q | R | *b* |
| 13 | A | B | E | D | F | G | J | I | K | L | O | N | P | Q | *e* | *g* |
| 14 | A | E | C | D | F | J | H | I | K | O | M | N | P | *d* | R | *i* |
| 20 | E | B | C | D | J | G | H | I | O | L | M | N | *a* | Q | R | *f* |

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 15 | *a* | *b* | *c* | *d* | *f* | *g* | *h* | *i* | *k* | *l* | *m* | *n* | *p* | *q* | *o* | *r* |
| 16 | *a* | *c* | *d* | *e* | *f* | *h* | *i* | *j* | *k* | *m* | *n* | *o* | *p* | *l* | *r* | *q* |
| 17 | *a* | *d* | *e* | *b* | *f* | *i* | *j* | *g* | *k* | *n* | *o* | *l* | *p* | *r* | | *q* |
| 18 | *a* | *e* | *b* | *c* | *f* | *j* | *g* | *h* | *k* | *o* | *l* | *m* | *p* | *r* | *q* | *n* |
| 19 | *e* | *b* | *c* | *d* | *j* | *g* | *h* | *i* | *o* | *l* | *m* | *n* | *p* | *q* | *k* | *r* |

Figure 14

SUCCESSIVE RAID DISTRIBUTION FOR SINGLE DISK EXPANSION WITH EFFICIENT AND BALANCED SPARE CAPACITY

TECHNICAL FIELD

The subject matter of this disclosure is generally related to management of spare storage capacity in an electronic data storage system.

BACKGROUND

Data storage systems use protection groupings to reduce the likelihood of data loss when disks fail. An example of a protection grouping is a redundant array of independent disks (RAID). RAID enables an inaccessible or failed protection group member to be reconstructed from the remaining members of the protection group. A RAID (D+P) protection group has D data members and P parity members. The data members contain data. The parity members contain parity information such as XORs of the data. The parity information enables recreation of the data in the event that a data member fails. The data can be used to recreate the parity information in the event that a parity member fails. Traditional disk arrays have idle disks that are reserved as spare storage capacity for reconstruction of failed disks.

SUMMARY

All examples, aspects and features mentioned in this document can be combined in any technically possible way.

A method in accordance with some implementations comprises: in an array of same-size drives in which redundant array of independent drives (RAID) D+P=N protection groups are implemented, creating a drive subset matrix with at least N+1 drives each having N*N same-size subdivisions; creating N submatrices and spares in the subdivisions equivalent to at least one drive of storage capacity; locating the spares such that every drive has an equal number of spares +/−1; locating one protection group in a lowest indexed subdivision of each of the submatrices; and locating members of other protection groups by selecting members in round robin order and placing each selected member in a free subdivision having a lowest drive index and lowest subdivision index.

An apparatus in accordance with some implementations comprises: a plurality of same-size non-volatile drives in which redundant array of independent drives (RAID) D+P=N protection groups are implemented; a plurality of interconnected compute nodes that manage access to the drives; and at least one drive manager configured to: create a drive subset matrix with at least N+1 drives each having N*N same-size subdivisions; create N submatrices and spares in the subdivisions equivalent to at least one drive of storage capacity; locate the spares such that every drive has an equal number of spares +/−1; locate one protection group in a lowest indexed subdivision of each of the submatrices; and locate members of other protection groups by selecting members in round robin order and placing each selected member in a free subdivision having a lowest drive index and lowest subdivision index.

In accordance with some implementations, a non-transitory computer-readable storage medium stores instructions that when executed by a computer cause the computer to perform a method in an array of same-size drives in which redundant array of independent drives (RAID) D+P=N protection groups are implemented, the method comprising: creating a drive subset matrix with at least N+1 drives each having N*N same-size subdivisions; creating N submatrices and spares in the subdivisions equivalent to at least one drive of storage capacity; locating the spares such that every drive has an equal number of spares +/−1; locating one protection group in a lowest indexed subdivision of each of the submatrices; and locating members of other protection groups by selecting members in round robin order and placing each selected member in a free subdivision having a lowest drive index and lowest subdivision index.

BRIEF DESCRIPTION OF THE FIGURES

FIG. 3 illustrates an example of balanced and efficient distribution of spare storage capacity.

FIG. 4 illustrates use of spare partitions to recover from failure of disk 4 using the balanced and efficient distribution of spares shown in FIG. 3.

FIG. 5 illustrates use of spare partitions to recover from failure of disk 5 using the balanced and efficient distribution of spares shown in FIG. 3.

FIG. 6 illustrates single disk expansion of the disk array shown in FIG. 3.

FIG. 7 illustrates creation of new protection groups in subdivisions freed by relocating selected protection group members to a new disk.

FIGS. 8 and 9 illustrate expansion with additional disks.

FIGS. 10 and 11 illustrate reorganization of spares to restore efficiency and balance after expansion and split.

FIG. 12 illustrates recovery from failure of disk 1.

FIG. 13 illustrates an example of balanced and efficient distribution of spare storage capacity following growth and split.

FIG. 14 illustrates recovery from failure of disk 17 using the distribution of spares shown in FIG. 13.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features such as, without limitation, tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Some of the processes described herein may be implemented with techniques described in one or more of U.S. patent application Ser. No. 16/891,116 titled Growing and Splitting a Disk Array by Moving RAID Group Members, U.S. patent application Ser. No. 17/061,922 titled CREATING AND DISTRIBUTING SPARE CAPACITY OF A DISK ARRAY, and U.S. patent application Ser. No. 16/508,762 titled SCALING RAID-BASED STORAGE BY REDISTRIBUTING SPLITS, each of which is incorporated by reference.

Figure 1:
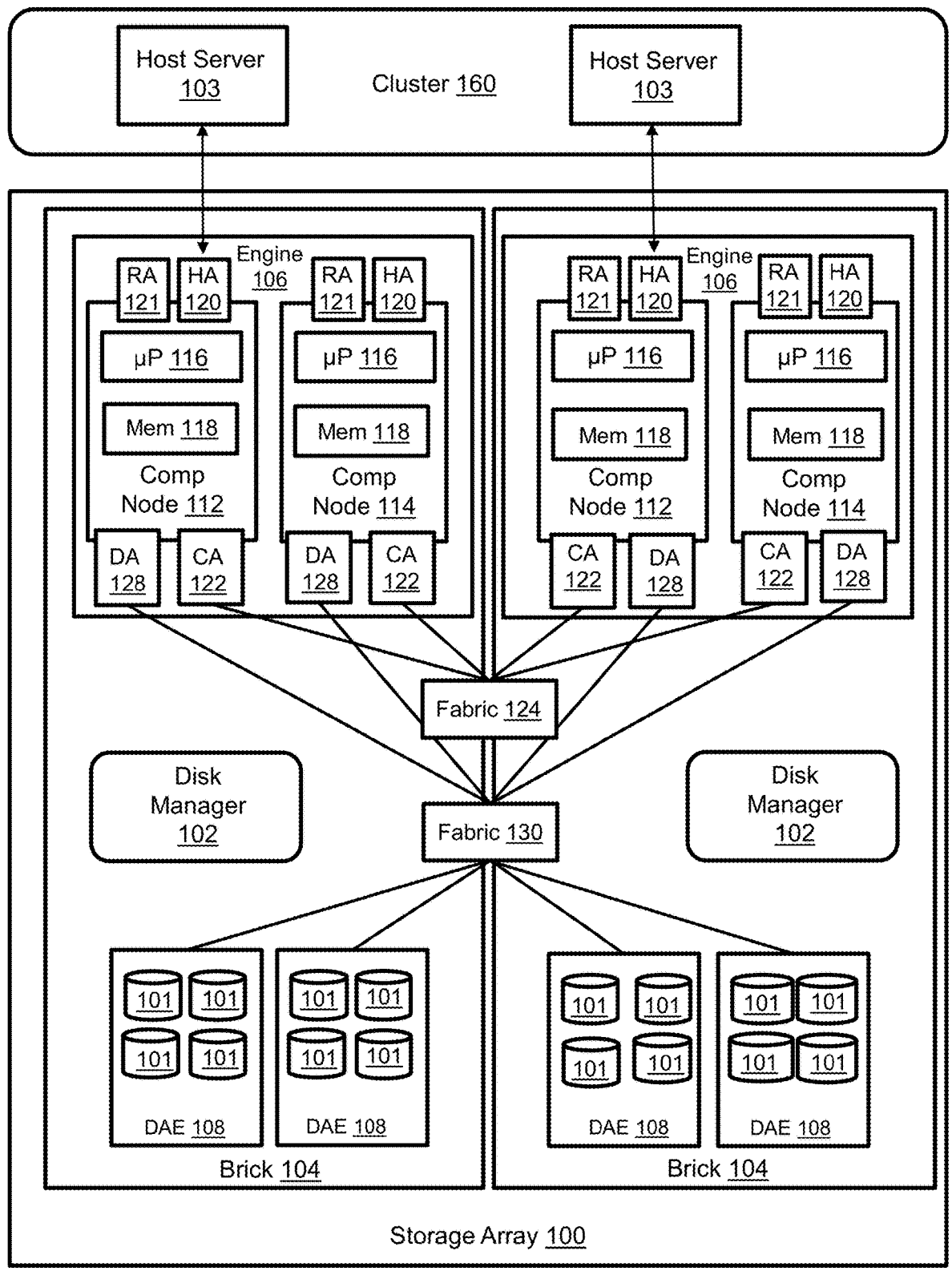
FIG. 1 illustrates a storage array with disk managers that implement balanced and efficient distribution of spare storage capacity and manage expansion of storage capacity in single disk increments.

FIG. 1 illustrates a storage array 100 with disk managers 102 that implement balanced and efficient distribution of spare storage capacity and manage expansion of storage capacity in single disk increments. Disk arrays or disk subsets thereof that are managed by the disk managers are scalable in single disk increments and can be split into multiple disk subsets when enough new disks have been added. Protection group members are relocated, and new protection groups are created as storage capacity is expanded by adding new disks to the disk subset. The disk managers reorganize the disk array or disk subset to restore balanced and efficient distribution of spare storage capacity following growth and split.

The storage array 100 is one example of a storage area network (SAN), which is just one example of a data storage system in which the disk managers 102 could be implemented. The storage array 100 is depicted in a simplified data center environment supporting a cluster 160 of host servers that run host applications. The host servers 103 include volatile memory, non-volatile storage, and one or more tangible processors. The storage array 100 includes one or more bricks 104. Each brick includes an engine 106 and one or more disk array enclosures (DAEs) 108. Each engine 106 includes a pair of interconnected compute nodes 112, 114 in a failover relationship with mirrored memory. The compute nodes may be referred to as "storage directors." Although it is known in the art to refer to the compute nodes of a SAN as "hosts," that naming convention is avoided in this disclosure to help distinguish the host servers 103 from the compute nodes 112, 114. Nevertheless, the host applications could run on the compute nodes, e.g., on virtual machines or in containers.

Each compute node 112, 114 of the storage array 100 includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The host adapter resources may include processors, volatile memory, and ports via which the host servers may access the storage array. Each compute node also includes a remote adapter (RA) 121 for communicating with other storage systems. Each compute node also includes one or more disk adapters (DAs) 128 for communicating with managed disks 101 in the DAEs 108. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed disks 101 include non-volatile storage media such as, without limitation, solid-state drives (SSDs) based on electrically erasable programmable read-only memory (EEPROM) technology such as NAND and NOR flash memory and hard disk drives (HDDs) with spinning disk magnetic storage media. For purposes of explanation, the managed disks described hereafter are same-size SSDs. Disk controllers may be associated with the managed disks as is known in the art. An interconnecting fabric 130 enables implementation of an N-way active-active backend. A backend connection group includes all disk adapters that can access the same disk or disks. In some implementations every disk adapter 128 in the storage array can reach every DAE via the fabric 130. Further, in some implementations every disk adapter in the storage array can access every managed disk 101.

Data associated with the host application instances running on the host servers 103 is maintained on the managed disks 101. The managed disks 101 are not discoverable by the host servers but the storage array creates a logical storage object referred to herein as a production volume that can be discovered and accessed by the host servers. Without limitation, such a storage object may be referred to as a source device, production device, or production LUN, where the logical unit number (LUN) is a number used to identify logical storage volumes in accordance with the small computer system interface (SCSI) protocol. From the perspective of the host servers 103, the production volume is a single disk having a set of contiguous fixed-size logical block addresses (LBAs) on which data used by the instances of the host application resides. However, the host application data is stored at non-contiguous addresses on various managed disks 101. The compute nodes maintain metadata that maps between the production volume and the managed disks 101 in order to process IOs from the host servers.

Figures 2A, 2B, 2C:
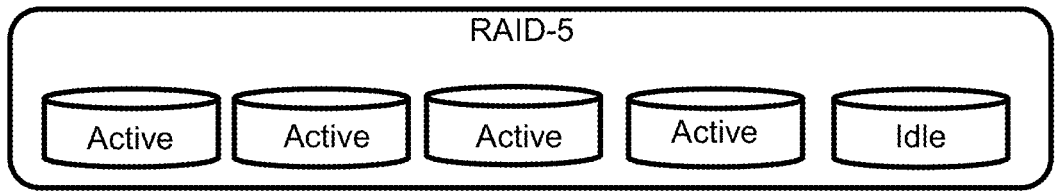
FIGS. 2A, 2B, and 2C illustrate tradeoffs between balance and efficiency in distribution of spare storage capacity.

FIGS. 2A, 2B, and 2C illustrate tradeoffs between balance and efficiency for different distributions of spare storage capacity. As shown in FIG. 2A, a RAID-5 (3+1) protection group can be implemented with D+P active disks and an additional idle disk for spare capacity. Such a configuration is both imbalanced and inefficient because all spare capacity is concentrated on one idle disk and expansion of storage capacity must be in units of D+P disks.

Referring to FIG. 2B, same-size subdivisions of disks can be configured as protection group members and spares. The disk subdivisions can be represented as a matrix of sequentially indexed disk rows and sequentially indexed subdivision columns. The RAID-5 (3+1) disk array shown in FIG. 2B has 8 disks indexed 1-8 with 16 subdivisions per disk indexed 1-16. There are 24 RAID groups on the disk array, with 4 members per group denoted by letters A-L and a-l. There is a perfect balance of 4 spares per disk. However, the configuration is inefficient because it requires at least 2*N disks, where N=D+P, for sufficient spares to recover from just a single disk failure. Only half of the spares can be effectively utilized, and capacity expansion is in N-disk increments at a minimum. Such drawbacks are more pronounced at higher values of N. For example, a RAID-6 (12+2) implementation would require at least 28 disks and would expand in 14-disk increments. The illustrated RAID-5 (3+1) implementation requires a minimum of 8 disks and 32 spares, i.e., spare capacity equivalent of 2 disks, and it may not have usable spare capacity for a second disk failure because a disk failure can only use spares co-located with unaffected RAID groups. The RAID groups and their usable spares are shown in grayscale.

FIG. 2C illustrates an alternative distribution of spares along diagonals in a configuration that supports granular single disk expansion. The specifically illustrated minimal RAID-5 (3+1) disk array has 5 same-size disks and 16 spares efficiently distributed to support a single disk failure recovery without any extra spares being wasted. However, the spares are unevenly distributed using only 4 of the 5 disks. More specifically, the first disk has no spares, and each of the other disks has 25% (4 out of 16 subdivisions) of the spare capacity. Consequently, there will be a greater amount of IO activity and higher write amplification on the first disk, leading to significant wear level imbalance and early failure of the first disk relative to the other disks.

FIG. 3 illustrates an example of balanced and efficient distribution of spare storage capacity. In general, a disk array or subset thereof in which RAID, e.g., a RAID-5 or RAID-6, is implemented with efficient and balanced distribution of spares can be configured using at least (N+1) same-size disks with N*N subdivisions per disk. The RAID-5 (3+1) examples in this disclosure have 16 subdivisions per disk, and 5 disks in a minimal disk array. There are 16 RAID groups with 4 members per group denoted alphabetically. The groups are organized in N submatrices (shown in different shades of grayscale), where each submatrix has N columns and N+1 rows. Members of the first respective protection group A, F, K, P in each submatrix are assigned to the first column (lowest subdivision index) in each submatrix. Members of every other protection group in the submatrix are assigned in round-robin order to free subdivisions at successively increasing rows and columns. For example, the four group members e, b, c, d are assigned iteratively in that order column-wise in the first submatrix in the following steps:
1. in the four subdivisions from row 5, column 1 to row 3, column 2,
2. in the four subdivisions from row 4, column 2 to row 2, column 3,
3. in the four subdivisions from row 3, column 3 to row 1, column 4, and
4. in the four subdivisions from row 2, column 4 to row 5 column 4.

Similarly, group members j, g, h, i and o, l, m, n are assigned column-wise in a round-robin manner in the second and third submatrices respectively. The spares, which are located in the remaining free subdivisions in the submatrix with the highest subdivisions, are balanced across the disks, where balance is defined as no two disks having more than 1 greater or 1 fewer spare than the other disks. The illustrated implementation has only 16 spares, which is equivalent of 1 disk of storage capacity but is sufficient to recover from a single disk failure. Such a distribution is efficient because no spares are wasted by not being used for rebuilding the RAID group members of the failed disk.

FIG. 4 illustrates use of the spare partitions to recover from failure of disk 4 using the balanced and efficient distribution of spares shown in FIG. 3. The P, A, F, K members are rebuilt on disk 5 because the other members of those protection groups are vertically distributed in same-subdivisions on disks 1-3. The members of the other groups e, b, c, j, g, h, o, l, m are rebuilt in order by increasing partition indices on disks 1-3. All available spares are used for recovery.

FIG. 5 illustrates use of the spare partitions to recover from failure of disk 5 using the balanced and efficient distribution of spares shown in FIG. 3. The members of groups e, b, c, j, g, h, I, o, l, m, n are rebuilt in order by increasing partition indices on disks 1-4. All available spares are used for recovery.

FIG. 6 illustrates single disk expansion of the disk array shown in FIG. 3. For the first new disk added to the minimal disk array, RAID group members from the second column/subdivision index of each submatrix are rotated onto the new disk in order by increasing subdivision indices. In the illustrated example, the members at subdivision 2 of disks 1-4 are rotated onto subdivisions 1-4 of disk 6, the members at subdivision 6 of disks 1-4 are rotated onto subdivisions 5-8 of disk 6, and members at subdivision 10 of disks 1-4 are rotated onto subdivisions 9-12 of disk 6. This may be generalized to rotating the members in the next lowest unrotated subdivision of each submatrix in order from left to right. The spares in the final, right-side submatrix need not be rotated because additional spares are created in the remaining free subdivisions of the new disk.

FIG. 7 illustrates creation of new protection groups in the subdivisions freed by relocation of protection group members to the new disk. Because the spares in column 14 are not freed by relocation, the freed subdivisions are in columns 2, 6, and 10. Those three sets of four subdivisions are enough to accommodate three new groups B, G, L. Members of new group B are located at subdivision 2 of disks 1-4. Members of new group G are located at subdivision 6 of disks 1-4. Members of subdivision L are located at subdivision 10 of disks 1-4. The remaining free subdivisions on the new disk are usable as spares, although not all the available spares would be needed to recover from failure of a single disk.

FIGS. 8 and 9 illustrate expansion of the disk array with additional disks. For each successive additional disk, RAID group members from the next (second lowest) unrotated column/subdivision index of each submatrix are rotated onto the new disk in order by increasing subdivision indices. New protection groups are created in the subdivisions freed by the rotation-relocations. The additional remaining free subdivisions are usable as spares, although not all the available spares would be needed to recover from failure of a single disk. After new disks #7 and #8 have been added, new RAID groups C, D, H, I, M, N are created by using the space vacated by relocating successive columns of members to the new disks. The disk array is virtually split into two subsets 10, 20, each of which contains its own distinct RAID groups. The illustrated disk array requires 28 spares (equivalent of 1.75 disks storage capacity) to recover from a single disk failure. FIG. 9 shows the disk array with one more disk #9 added. Four more RAID groups a, f, k, p have been created.

The second subset 20 cycles back to the initial distribution shown in FIG. 3. The system still has 28 spares to recover from a single disk failure.

FIGS. 10 and 11 illustrate reorganization of the spares to restore efficiency and balance after disk array expansion and split. The spares in the first subset 10 depicted in FIG. 9 cannot be used to recover from any disk failure within the subset because of the vertical distribution of protection groups. However, recovery efficiency can be improved by adding another disk to the first subset. In the illustrated example, a new disk #10 is added to the first subset and RAID group members B, C, D from 3 disks #2, #3, #4 are relocated to the new disk, vacating space for new RAID groups to be created. FIG. 11 shows the addition of three new RAID groups E, J, O using the vacated space. The resulting subset is capable of recovery from a disk failure.

FIG. 12 illustrates recovery from failure of disk 1. The spares efficiency is improved because any single disk failure can be recovered using spares within the subset. As shown in the illustrated example, all 16 spares are used when disk #1 fails. The array has 32 spares shared by both subsets and can recover from 2 disk failures: 1 failure per subset simultaneously, or 2 failures where the second failure happens after the first failure has been recovered. For example, if another disk of the subset fails, all 16 affected RAID members can be recovered using the 16 spares located in the other subset. Thus, all spares will be efficiently used.

FIG. 13 illustrates an example of balanced and efficient distribution of spare storage capacity following growth and split. As the array expands, new subsets are created using the procedures described above. New spares are added in the last submatrix of each subset until there are sufficient spares to recover from a predetermined number of disk failures, beyond which no more spares will be added, and existing spares are widely distributed to more subsets as the array expands. For example, 32 spares distributed over 2 disk array subsets may be redistributed over 4 disk array subsets, so that each subset contains 8 spares following redistribution. The last submatrix of each subset will be filled in for RAID groups containing data. These new RAID groups may follow the same allocation patterns of existing RAID groups. Two examples of such configurations are shown. The spares are widely distributed and mostly balanced, with 1 or 2 spares per disk.

FIG. 14 illustrates recovery from failure of disk 17 using the distribution of spares shown in FIG. 13. All spares are efficiently used when disk #17 fails. The distribution guarantees a spares assignment where all RAID group members are located on different disks.

Figure 15:
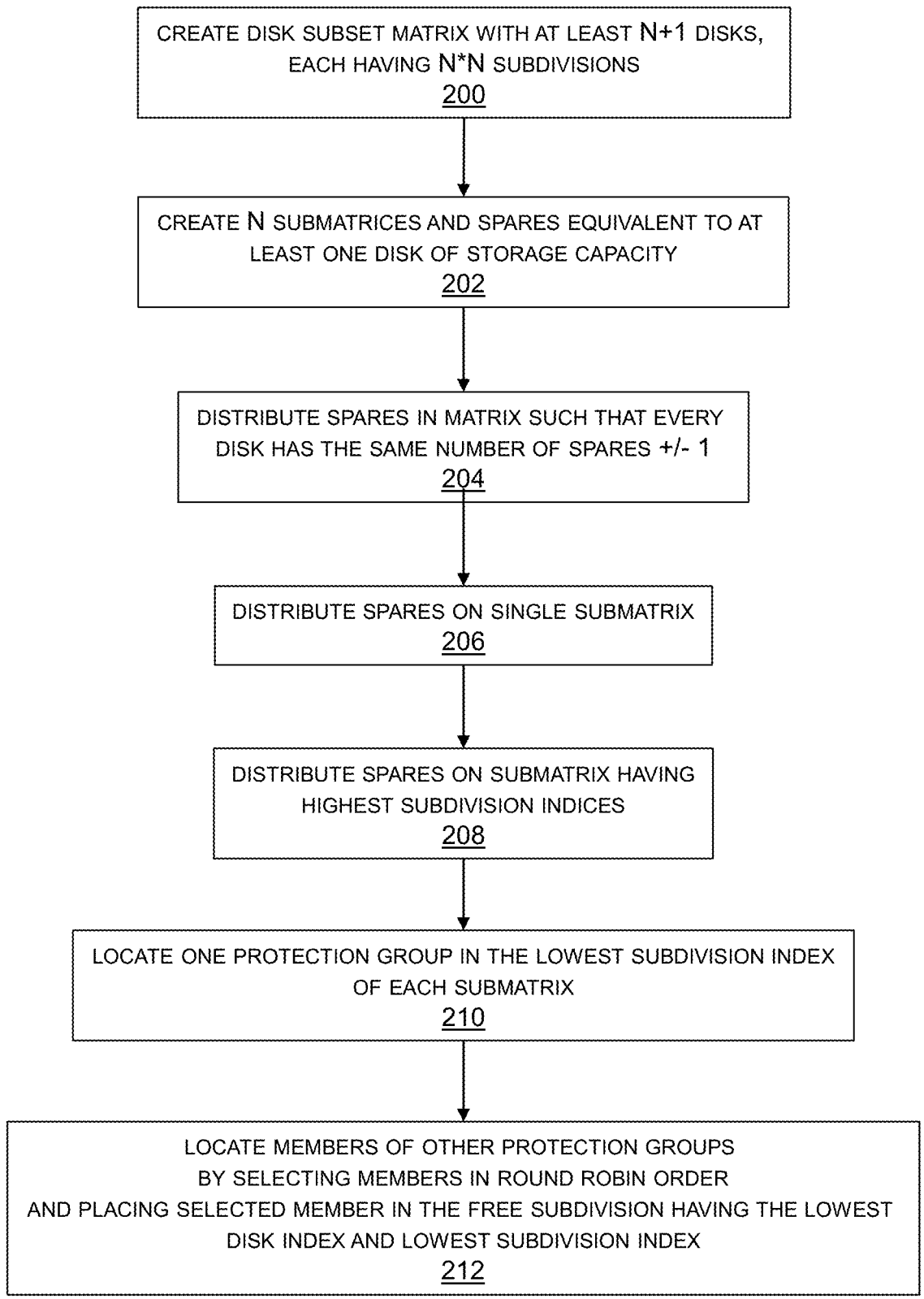
FIG. 15 illustrates a method for implementing balanced and efficient distribution of spare storage capacity.

FIG. 15 illustrates a method for implementing balanced and efficient distribution of spare storage capacity. A disk subset matrix with at least N+1 same-size disks, each having N*N same-size subdivisions is created in step 200, where N=D+P is the number of members in a RAID group. Step 202 is creating N submatrices and a quantity of spare subdivisions that equal at least one disk of storage capacity. Step 204 is distributing the spares in the matrix that represents the disk subset such that every disk has the same number of spares +/−1. The spares may be equally distributed if possible and, if not possible, distributed as equally as possible across all disks of the disk subset. Optional step 206 is distributing the spares on a single submatrix of the matrix that represents the disk subset. Optional step 208 is distributing the spares on the single submatrix characterized by the highest subdivision indices. Step 210 is locating one protection group in the lowest subdivision index of each submatrix. This corresponds to the vertically-oriented groups shown in FIG. 3. A different group is located in each submatrix. Step 212 is locating the members of other protection groups in free subdivisions by selecting members from the set of groups in round robin order and placing the selected members in the next available free subdivision characterized by lowest disk index and lowest subdivision index. This corresponds to distribution of members of groups e, b, c, d in FIG. 3, with reference to which the order of selection is iterated, e, b, c, d, e, b, c, d, etc., from subdivision 1, disk 5, to subdivision 2, disk 1, subdivision 2, disk 2, subdivision 2, disk 3, and so forth. It should be noted that the protection group members could be distributed according to steps 210 and 212 before creating the spares because the remaining subdivisions that are available to be designated as spares will be distributed in a balanced manner.

Figure 16:
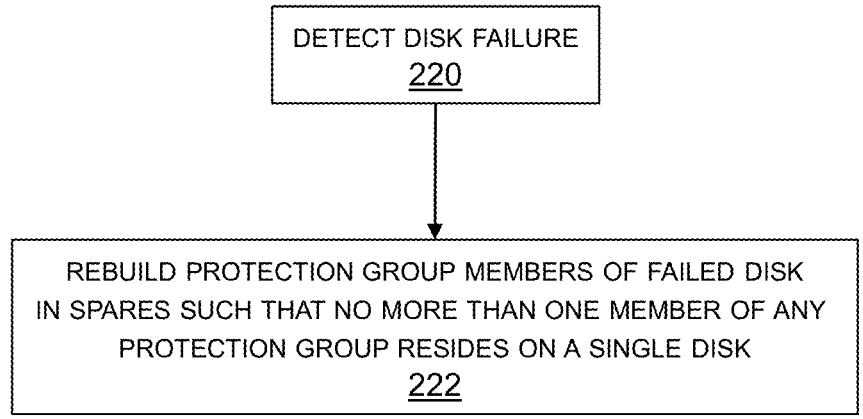
FIG. 16 illustrates a method for responding to disk failure.

FIG. 16 illustrates a method for responding to disk failure. Step 220 is detecting failure of a disk. Step 222 is rebuilding the protection group members of the failed disk in spares such that no more than one member of any protection group resides on a single disk. Selection of spares for rebuilding of particular members may be implemented algorithmically or heuristically.

Figure 17:
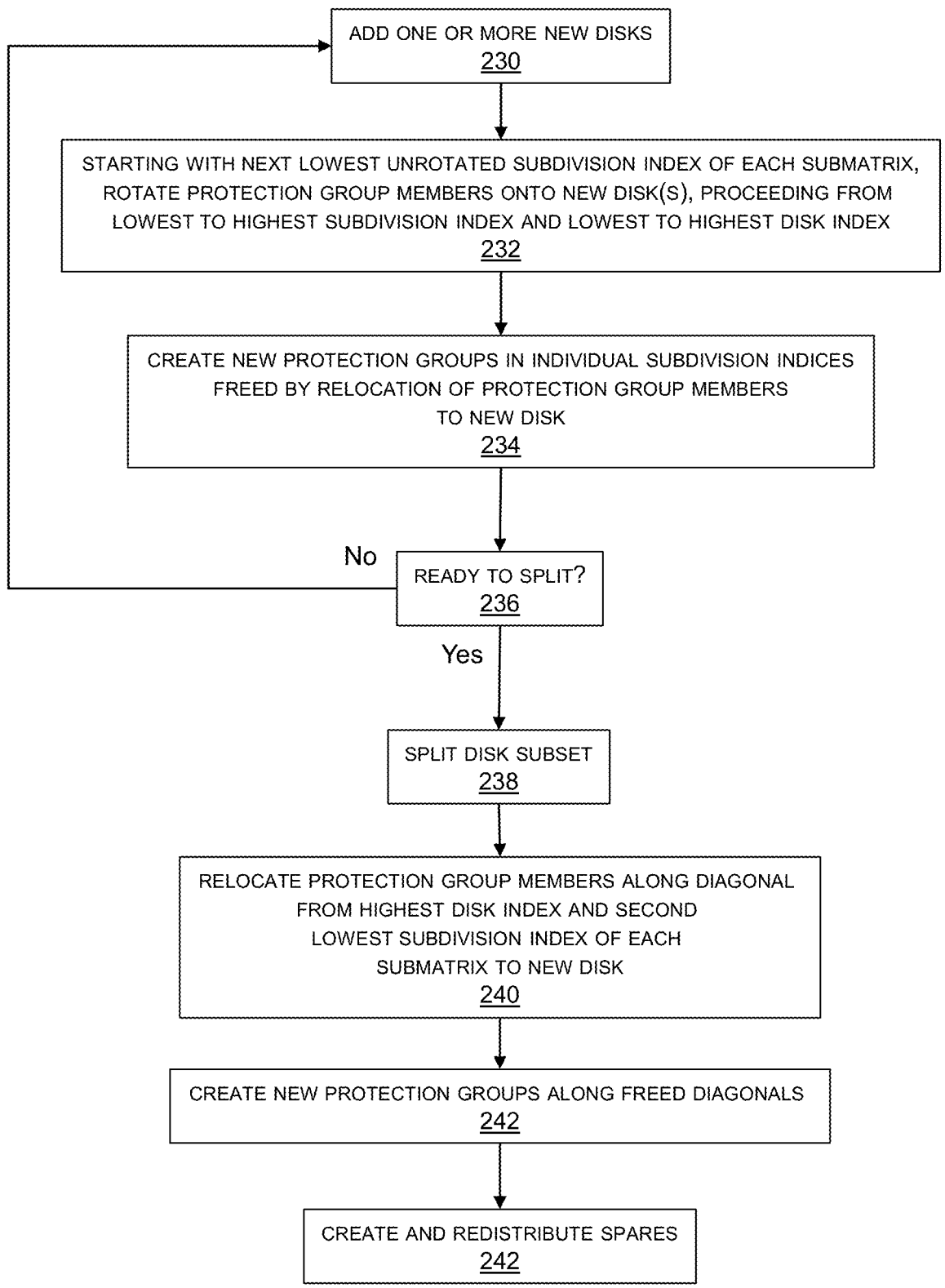
FIG. 17 illustrates a method for expansion of disk array storage capacity.

FIG. 17 illustrates a method for expansion of disk array storage capacity. Step 230 is adding one or more new disks to a disk subset. Step 232 is rotating protection group members onto the new disk(s) starting with the next lowest unrotated subdivision index of each submatrix and proceeding from the lowest to highest subdivision index and lowest to highest disk index of the new disk(s). Step 234 is creating new same-subdivision protection groups in the subdivision indices freed by relocation of protection group members to the new disk(s). Step 236 is determining whether there are enough disks to split the disk subset. If there are not enough disks to split the disk subset, then flow returns to step 230. If there are enough disks to split the disk subset, then the disk subset is split in step 238. At least one of the resulting disk subsets may be reorganized by relocating protection group members along diagonals from the highest disk index and second lowest unrelocated subdivision index of each submatrix to a new disk in step 240. New protection groups are created along the freed diagonals as indicated in step 242. Spares are created to enable recovery from a predetermined number of disk failures and redistributed to more subsets as the array expands as indicated in step 242.

Specific examples have been presented to provide context and convey inventive concepts. The specific examples are not to be considered as limiting the scope of the invention. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   in an array of same-size drives in which redundant array of independent drives (RAID) D+P=N protection groups are implemented, creating a drive subset matrix with at least N+1 drives each having N*N same-size subdivisions;
   creating N submatrices and spares in the subdivisions equivalent to at least one drive of storage capacity;
   locating the spares such that every drive has an equal number of spares +/−1;
   locating one protection group in a lowest indexed subdivision of each of the submatrices; and locating members of other protection groups by selecting members in round robin order and placing each selected member in a free subdivision having a lowest drive index and lowest subdivision index.

2. The method of claim 1 further comprising locating the spares on only one of the submatrices.

3. The method of claim 2 further comprising locating the spares on the submatrix having the highest subdivision indices.

4. The method of claim 3 further comprising adding a new drive to the drive subset matrix and rotating protection group members onto the new drive starting with a next lowest unrotated subdivision index of each submatrix and proceeding from a lowest to highest subdivision index and lowest to highest drive index of the new drive.

5. The method of claim 4 further comprising creating new protection groups in individual subdivision indices freed by relocation of protection group members to the new drive.

6. The method of claim 5 further comprising splitting the drive subset matrix into two drive subset matrices and reorganizing at least one of the two drive subset matrices.

7. The method of claim 6 further comprising adding at least one new drive and creating new protection groups along freed diagonals.

8. An apparatus, comprising:
a plurality of same-size non-volatile drives in which redundant array of independent drives (RAID) D+P=N protection groups are implemented;
a plurality of interconnected compute nodes that manage access to the drives; and
at least one drive manager configured to:
create a drive subset matrix with at least N+1 drives each having N*N same-size subdivisions;
create N submatrices and spares in the subdivisions equivalent to at least one drive of storage capacity;
locate the spares such that every drive has an equal number of spares +/−1;
locate one protection group in a lowest indexed subdivision of each of the submatrices; and
locate members of other protection groups by selecting members in round robin order and placing each selected member in a free subdivision having a lowest drive index and lowest subdivision index.

9. The apparatus of claim 8 further comprising the at least one drive manager configured to locate the spares on only one of the submatrices.

10. The apparatus of claim 9 further comprising the at least one drive manager configured to locate the spares on the submatrix having the highest subdivision indices.

11. The apparatus of claim 10 further comprising the at least one drive manager configured to rotate protection group members onto a new drive starting with a next lowest unrotated subdivision index of each submatrix and proceeding from a lowest to highest subdivision index and lowest to highest drive index of the new drive.

12. The apparatus of claim 11 further comprising the at least one drive manager configured to create new protection groups in individual subdivision indices freed by relocation of protection group members to the new drive.

13. The apparatus of claim 12 further comprising the at least one drive manager configured to split the drive subset matrix into two drive subset matrices and reorganize at least one of the two drive subset matrices.

14. The apparatus of claim 13 further comprising the at least one drive manager configured to relocate protection group members along diagonals to a new drive and create new protection groups along freed diagonals.

15. A non-transitory computer-readable storage medium storing instructions that when executed by a computer cause the computer to perform a method in an array of same-size drives in which redundant array of independent drives (RAID) D+P=N protection groups are implemented, the method comprising:
creating a drive subset matrix with at least N+1 drives each having N*N same-size subdivisions;
creating N submatrices and spares in the subdivisions equivalent to at least one drive of storage capacity;
locating the spares such that every drive has an equal number of spares +/−1;
locating one protection group in a lowest indexed subdivision of each of the submatrices; and
locating members of other protection groups by selecting members in round robin order and placing each selected member in a free subdivision having a lowest drive index and lowest subdivision index.

16. The computer-readable storage medium of claim 15 in which the method further comprises locating the spares on only one of the submatrices.

17. The computer-readable storage medium of claim 16 in which the method further comprises locating the spares on the submatrix having the highest subdivision indices.

18. The computer-readable storage medium of claim 17 in which the method further comprises adding a new drive to the drive subset matrix and rotating protection group members onto the new drive starting with a next lowest unrotated subdivision index of each submatrix and proceeding from a lowest to highest subdivision index and lowest to highest drive index of the new drive.

19. The computer-readable storage medium of claim 18 in which the method further comprises creating new protection groups in individual subdivision indices freed by relocation of protection group members to the new drive.

20. The computer-readable storage medium of claim 19 in which the method further comprises creating new protection groups along freed diagonals.

* * * * *